(12) United States Patent
Jang et al.

(10) Patent No.: US 11,845,071 B2
(45) Date of Patent: *Dec. 19, 2023

(54) INTERMETALLIC CATALYST AND METHOD FOR PREPARING THE SAME

(71) Applicants: Hyundai Motor Company, Seoul (KR); Kia Corporation, Seoul (KR)

(72) Inventors: Ji-Hoon Jang, Gyeonggi-do (KR); Eunjik Lee, Gyeonggi-do (KR); Dahee Kwak, Gyeonggi-do (KR); Jee Youn Hwang, Seoul (KR); Songi Oh, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 159 days.

This patent is subject to a terminal disclaimer.

(21) Appl. No.: 17/397,246

(22) Filed: Aug. 9, 2021

(65) Prior Publication Data
US 2022/0219158 A1 Jul. 14, 2022

(30) Foreign Application Priority Data

Jan. 14, 2021 (KR) .......................... 10-2021-0005302

(51) Int. Cl.
*B01J 37/00* (2006.01)
*B01J 37/08* (2006.01)
(Continued)

(52) U.S. Cl.
CPC ....... *B01J 37/0018* (2013.01); *B01J 23/8906* (2013.01); *B01J 35/0006* (2013.01);
(Continued)

(58) Field of Classification Search
CPC .......................... B01J 37/0018; B01J 23/8906; B01J 35/0006; B01J 35/023; B01J 35/08;
(Continued)

(56) References Cited

U.S. PATENT DOCUMENTS

2013/0177838 A1* 7/2013 Wang ................... B01J 23/6567
429/525
2014/0171290 A1* 6/2014 Lopez ...................... B01J 37/08
502/182

(Continued)

FOREIGN PATENT DOCUMENTS

JP         2016126907 A  *  7/2016  ............. B01J 23/89
WO    WO-2013117725 A1  *  8/2013  ............. B01J 21/18

OTHER PUBLICATIONS

"Carbon supported Pt70Co30 electrocatalyst prepared by the formic acid method for the oxygen reduction reaction in polymer electrolyte fuel cells", J. Power Sources 141 (2005), 13-18).
(Continued)

*Primary Examiner* — Patricia L. Hailey
(74) *Attorney, Agent, or Firm* — Fox Rothschild LLP

(57) ABSTRACT

Disclosed is a method of preparing an intermetallic catalyst that includes irradiating ultrasonic waves to a precursor admixture including a noble metal precursor, a transition metal precursor, and a carrier to form core-shell particles including a transition metal oxide coating layer; the annealing the core-shell particles to form intermetallic particles including a transition metal oxide coating layer; and the removing the transition metal oxide coating layer from the intermetallic particles.

20 Claims, 16 Drawing Sheets

(51) Int. Cl.
  *B01J 23/89* (2006.01)
  *B01J 37/34* (2006.01)
  *B01J 35/00* (2006.01)
  *B01J 35/08* (2006.01)
  *B01J 37/02* (2006.01)
  *B01J 35/02* (2006.01)
  *B01J 21/18* (2006.01)

(52) U.S. Cl.
  CPC ............. *B01J 35/023* (2013.01); *B01J 35/08* (2013.01); *B01J 37/0221* (2013.01); *B01J 37/08* (2013.01); *B01J 37/343* (2013.01); *B01J 21/18* (2013.01)

(58) Field of Classification Search
  CPC .... B01J 35/0086; B01J 37/0221; B01J 37/08; B01J 37/343; B01J 21/18
  USPC ........... 502/5, 182, 184, 185, 326, 329, 330, 502/337–339, 349–351, 516
  See application file for complete search history.

(56) References Cited

U.S. PATENT DOCUMENTS

2014/0171297 A1\* 6/2014 Goia .................. B01J 35/08
                                                    977/773
2016/0079607 A1\* 3/2016 Kaneko ............... H01M 4/9041
                                                    429/465

OTHER PUBLICATIONS

"Tailoring, Structure, and Activity of Carbon-Supported Nanosized Pt—Cr Alloy Electrocatalysts for Oxygen Reduction in Pure and Methanol-Containing Electrolytes", J. Phys. Chem. B 108 (2004), 1938-1947).
"Nanostructured Pt-M/C (M = Fe and Co) catalysts prepared by a microemulsion method for oxygen reduction in proton exchange membrane fuel cells", Electrochim. Acta 50 (2005), 2323-2329).
"Nano-stuctured Pt—Fe/C as cathode catalyst in direct methanol fuel cell", Electrochim. Acta 49 (2004), 1045-1055).

\* cited by examiner

INTERMETALLIC CATALYST AND METHOD FOR PREPARING THE SAME

CROSS-REFERENCE TO RELATED APPLICATION

This application claims priority to and the benefit of Korean Patent Application No. 10-2021-0005302 filed in the Korean Intellectual Property Office on Jan. 14, 2021, the entire contents of which are incorporated herein by reference.

TECHNICAL FIELD

The present invention relates to an intermetallic catalyst for a fuel cell and a method for preparing the same.

BACKGROUND

A fuel cell is an energy conversion device that directly converts chemical energy of a fuel into electrical energy. Because fuel cell has superior efficiency compared with existing internal combustion engines, it has been spotlighted as a next-generation energy source due to its high energy density and environment-friendliness.

Polyelectrolyte fuel cells (PEMFC) and direct methanol fuel cells (DMFC) mainly operate at a low temperature of less than or equal to about 80° C., and thus an electrode catalyst is required to increase rates of oxidation and reduction reactions of the fuel cell. In particular, platinum has been mainly used as an electrode catalyst for a fuel cell because it is the only catalyst capable of promoting oxidation of fuel (hydrogen or alcohol) and reduction of oxygen from room temperature to around 100° C. However, since platinum reserves are limited and very expensive, it is very important to reduce the amount of platinum used or maximize catalytic activity per unit mass for commercialization of fuel cells.

In order to achieve the above object, studies on platinum alloy catalysts have been conducted. For example, platinum alloy catalysts theoretically have greater activity and stability than pure platinum catalysts due to electrical and structural characteristics of the particle surface, and thus are attracting attention as a reliable alternative to fuel cell electrode materials.

Generally, a platinum alloy catalyst is prepared by depositing a transition metal precursor with a start material of a platinum catalyst and annealing the same at a temperature of 700° C. to 1200° C. using a gaseous reducing agent such as hydrogen. However, such a high-temperature annealing process may increase a size of an alloy particle, thereby reducing a catalyst activity.

Accordingly, it has been researched to provide a method of preparing an alloy catalyst without a high-temperature annealing process, for example, a chemical reduction process, a carbonyl complex process, a microemulsion process, and a polyol process. However, the alloy catalyst prepared by above methods has problems that a significant amount of the transition metal is present on the surface of the particle without forming an alloy, and is easily melted during operation of the fuel cell, thereby reducing durability as well as catalytic activity.

Therefore, in order to prepare an alloy catalyst that satisfies high catalytic activity and durability for use as a fuel cell catalyst, there is a need for a new process capable of suppressing the growth of particle size even when high-temperature annealing is performed.

SUMMARY OF THE INVENTION

In one preferred aspect, provided is a method of preparing an intermetallic catalyst in which an alloy catalyst simultaneously satisfying high catalytic activity and durability is prepared by regularly arranging metal atoms in an alloy through a high-temperature annealing process to increase composition uniformity and the catalytic activity and simultaneously controlling the alloy to have a particle size of several nanometers and which may reduce a cost by simplifying the process.

In one preferred aspect, provided is an intermetallic catalyst prepared using the method of preparing an intermetallic catalyst.

The term "intermetallic compound" or "intermetallic alloy" as used herein generally refers to a metal compound or metal alloy compound that has a specific chemical formula formed by ionic or covalent bonding and includes the metals (e.g., metal atoms) fixed or very limited in variability. In certain preferred aspects, an intermetallic compound or intermetallic alloy may forms a specific crystal structure, for example, by placing a specific single element in the specific position in the crystal structure such that those intermetallic compounds can have high melting point, or resistance to high temperatures but low ductility. In certain aspects, such property can be distinct from conventional (or non-intermetallic) metal alloys, which may be formed from disordered solid solution of one or more metallic elements, and do not have a specific chemical formula or crystal structure. Exemplary intermetallic compound or alloy may include i) noble metals selected from the group consisting of platinum (Pt), ruthenium (Ru), osmium (Os), iridium (Ir), palladium (Pd), and an alloy thereof; and ii) transition metals selected from the group consisting of cobalt (Co), iron (Fe), nickel (Ni), zinc (Zn), tin (Sn), manganese (Mn), copper (Cu), scandium (Sc), titanium (Ti), vanadium (V), chromium (Cr), zirconium (Zr), yttrium (Y), niobium (Nb), molybdenum (Mo), ruthenium (Ru), rhodium (Rh), osmium (Os), palladium (Pd), cadmium (Cd), iridium (Ir), gold (Au), silver (Ag), and an alloy thereof.

In one preferred aspect, provided is an electrode including the intermetallic catalyst.

In one preferred aspect, provided is a membrane-electrode assembly including an electrode.

In one preferred aspect, provided is a fuel cell including a membrane-electrode assembly.

In one aspect, a method of preparing an intermetallic catalyst is provided comprising: (a) forming core-shell particles comprising a transition metal oxide coating layer; (b) treating the core-shell particles to form intermetallic particles including a transition metal oxide coating layer; and (c) removing the transition metal oxide coating layer from the intermetallic particles. The the core shell particles may be formed in a variety of ways including by one or more steps comprising treating a precursor admixture comprising a noble metal precursor and a transition metal precursor with ultrasonic waves. The precursor admixture suitably may further comprise a carrier.

In an aspect, provided is a method of preparing an intermetallic catalyst, and the method may include forming core-shell particles including a transition metal oxide coating layer by irradiating ultrasonic waves to a precursor admixture including a noble metal precursor, a transition metal precursor, and a carrier; forming intermetallic particles including a transition metal oxide coating layer by annealing the core-shell particles; and removing the transition metal oxide coating layer from the intermetallic particles.

The core-shell particles may include a transition metal core, a noble metal shell surrounding the transition metal core, and a transition metal oxide coating layer surrounding the noble metal shell.

The transition metal in the transition metal oxide coating layer and the transition metal in the transition metal core may be the same transition metal derived from a transition metal precursor.

A thickness of the transition metal oxide coating layer may be about 0.2 nm to about 0.88 nm.

The noble metal may include one or more selected from the group consisting of platinum (Pt), ruthenium (Ru), osmium (Os), iridium (Ir), palladium (Pd), and an alloy thereof.

The transition metal may include one or more selected from the group consisting of cobalt (Co), iron (Fe), nickel (Ni), zinc (Zn), tin (Sn), manganese (Mn), copper (Cu), scandium (Sc), titanium (Ti), vanadium (V), chromium (Cr), zirconium (Zr), yttrium (Y), niobium (Nb), molybdenum (Mo), ruthenium (Ru), rhodium (Rh), osmium (Os), palladium (Pd), cadmium (Cd), iridium (Ir), gold (Au), silver (Ag), and an alloy thereof.

The carrier may include one or more selected from the group consisting of carbon black, graphite, a carbon nanofiber, a graphitized carbon nanofiber, a carbon nanotube, a carbon nanohorn, and a carbon nanowire.

The irradiating of the ultrasonic waves may be performed for about 20 minutes to about 4 hours at an output of about 125 W to about 200 W based on 100 mL of the precursor admixture.

Each of the intermetallic particles may include an intermetallic core including a transition metal and a noble metal, and a transition metal oxide coating layer surrounding the intermetallic core.

The annealing may be performed at a temperature of about 700° C. to about 1200° C. for about 0.5 hours to about 16 hours.

The annealing may be performed under a mixed gas including hydrogen ($H_2$) and argon (Ar), and the mixed gas may include hydrogen ($H_2$) in an amount of about 1 volume % to about 10 volume % based on a total volume of the mixed gas.

The removing of the transition metal oxide coating layer from the intermetallic particles may be performed by acid treatment.

The acid treatment may be performed at a temperature of about 60° C. to about 94° C. for about 2 hours to about 4 hours.

The acid used for the acid treatment may include $HClO_4$, $HNO_3$, HCl, or a combination thereof.

A concentration of the acid may be about 0.01 M to about 1.0 M.

In an aspect, provided is an intermetallic catalyst that includes an intermetallic core of a transition metal and a noble metal, and a noble metal skin layer surrounding the intermetallic core.

In the intermetallic catalyst, an atomic ratio of the noble metal and the transition metal may be about 1:0.5 to about 1:2.0.

A particle diameter of the intermetallic catalyst may be about 3.5 nm to about 20 nm.

A thickness of the noble metal shell may be less than or equal to about 0.5 nm.

The intermetallic core may have a degree of ordering of atomic arrangement of greater than or equal to about 30%.

The methods of preparing an intermetallic catalyst according to various exemplary embodiments may provide an alloy catalyst simultaneously satisfying high catalytic activity and durability by regularly arranging metal atoms in an alloy through a high-temperature annealing process to increase composition uniformity and catalytic activity and simultaneously controlling the alloy to have a particle size of several nanometers and reduce a cost by simplifying the process.

Other aspects of the invention are disclosed infra.

DETAILED DESCRIPTION

The advantages and features of the present disclosure and the methods for accomplishing the same will be apparent from the embodiments described hereinafter with reference to the accompanying drawings. However, the embodiments should not be construed as being limited to the embodiments set forth herein. Unless otherwise defined, all terms (including technical and scientific terms) used herein have the same meaning as commonly understood by one of ordinary skill in the art. In addition, terms defined in a commonly used dictionary are not to be ideally or excessively interpreted unless explicitly defined. In addition, unless explicitly described to the contrary, the word "comprise", and variations such as "comprises" or "comprising," will be understood to imply the inclusion of stated elements but not the exclusion of any other elements.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Further, where a numerical range is disclosed herein, such range is continuous, and includes unless otherwise indicated, every value from the minimum value to and including the maximum value of such range. Still further, where such a range refers to integers, unless otherwise indicated, every integer from the minimum value to and including the maximum value is included.

Further, the singular includes the plural unless mentioned otherwise.

A method of preparing an intermetallic catalyst includes: forming core-shell particles including a transition metal oxide coating layer by irradiating ultrasonic waves to a precursor admixture, forming intermetallic particles including a transition metal oxide coating layer by annealing the core-shell particles, and removing the transition metal oxide coating layer from the intermetallic particles.

Figure 1:
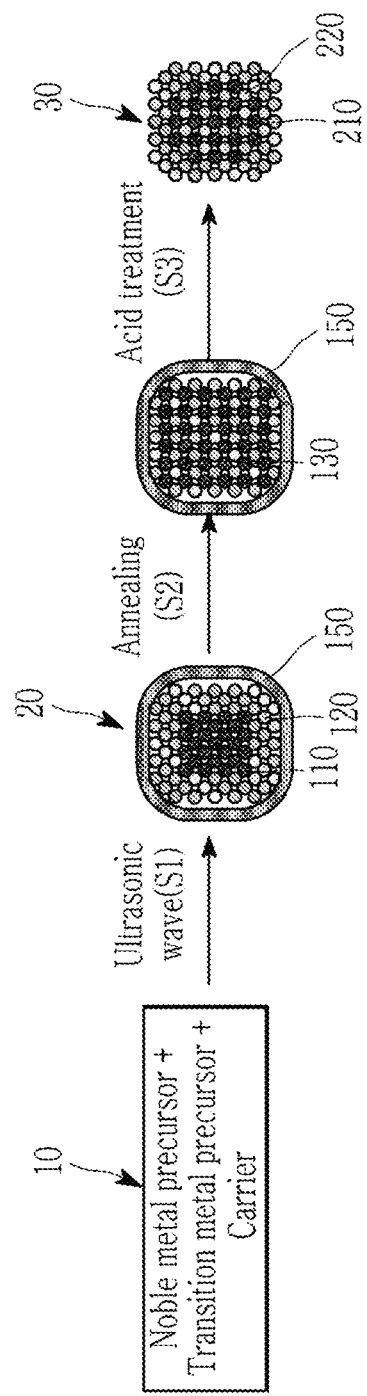
FIG. 1 shows an exemplary method of preparing an intermetallic catalyst according to an exemplary embodiment of the present invention.

FIG. 1 shows an exemplary method of preparing an intermetallic catalyst according to an exemplary embodiment of the present invention. For example, a method of preparing an intermetallic catalyst is described.

The core-shell particles 20 including the transition metal oxide coating layer 150 may be formed by irradiating ultrasonic waves to the precursor admixture 10 including the noble metal precursor, the transition metal precursor, and the carrier (S1).

High frequency oscillation of the ultrasonic waves may generate bubbles in a cavity, resulting in oscillatory growth, and when the oscillation finally reaches a certain scale, the cavity may explode. This series of processes caused by the ultrasonic irradiation is called to be "an acoustics cavitation mechanism."

The cavity explosion occurring in the final stage of the acoustics cavitation mechanism may cause a huge amount of thermal energy up to about 5000 K, which is dissipated in a very short time of about $10^{-6}$ seconds.

When reactants in the chemical reaction combined with ultrasonic irradiation are at least two materials having different vapor pressures, the at least two reactants may have different evaporation rates to bubbles by a high frequency oscillation of ultrasonic waves, so that structural and electrochemical characteristics of the reaction resultants may be controlled using the same. For example, when nanoparticles including at least two metals are prepared by using a noble metal precursor and a transition metal precursor as reactants and irradiating the same with ultrasonic waves, distributions of the noble metal and the transition metal elements in nanoparticles may be controlled according to a vapor pressure difference of the noble metal precursor and the transition metal precursor.

For example, in the nanoparticles, the noble metal having a low vapor pressure may be disposed in shell portions, and the transition metal having a high vapor pressure may be disposed in core portions, forming core-shell particles 20.

The irradiating of the ultrasonic waves may be performed for about 20 minutes to about 4 hours at an output of about 125 W to about 200 W based on 100 mL of the precursor admixture 10. When the irradiating of the ultrasonic waves is performed at an output of less than about 125 W or for a time of less than about 20 minutes, metal ions may be insufficiently reduced; while when at greater than about 200 W or for greater than about 4 hours, they may be grown to an unnecessary particle size.

The noble metal may include one or more selected from the group consisting of platinum (Pt), ruthenium (Ru), osmium (Os), iridium (Ir), palladium (Pd), and an alloy thereof. The noble metal precursor may include those having a lower vapor pressure than the vapor pressure of the transition metal precursor and contributing to a galvanic substitution reaction after forming transition metal seed particles and enlarging the sizes thereof. For example, the noble metal precursor may be in a form of a noble metal salt, and may include a nitrate, a sulfate, an acetate, a chloride, an oxide, or a combination thereof. For example, the noble metal precursor may be an acetyl acetonate of noble metal, a hexafluoroacetyl acetonate of the noble metal, or pentafluoroacetyl acetonate of the noble metal.

The transition metal may include one or more selected from the group consisting of cobalt (Co), iron (Fe), nickel (Ni), zinc (Zn), tin (Sn), manganese (Mn), copper (Cu), scandium (Sc), titanium (Ti), vanadium (V), chromium (Cr), zirconium (Zr), yttrium (Y), niobium (Nb), an alloy thereof, or a mixture thereof.

The transition metal precursor may be in a form of salts of the transition metal, and may include, for example, a nitrate, a sulfate, an acetate, a chloride, an oxide, or a combination thereof. For example, the transition metal precursor may be an acetyl acetonate of the transition metal, a hexafluoroacetyl acetonate of the transition metal, or a pentafluoroacetyl acetonate of the transition metal.

The transition metal precursor may be rapidly volatilized by a high vapor pressure and rapidly captured in cavity by the ultrasonic waves, so the transition metal may be disposed in a core portion in the core-shell particles 20.

The carrier may include a carbon carrier, for example, one or more selected from the group consisting of carbon black, graphite, carbon nanofiber, graphitized carbon nanofiber, carbon nanotube, carbon nanohorn, and carbon nanowire. The carbon black may include denka black, ketjen black, acetylene black, channel black, furnace black, lamp black, thermal black, or a combination thereof.

The precursor admixture 10 may further include a reducing solvent.

The reducing solvent may include an organic material having no moisture and oxygen source, for example, a solvent having a reducing power at a temperature of greater than or equal to about 70° C. or a solvent having a reducing power at a temperature of about 70° C. to about 400° C. For example, the reducing solvent may suitably include ethylene glycol, di-ethylene glycol, tri-ethylene glycol, poly-ethylene glycol, glycerol, or a combination thereof.

The reducing solvent may reduce reactants of a noble metal precursor and a transition metal precursor in cavity formed by the ultrasonic treatment and is to maintain a high boiling point to create external liquid environment for generating and extinguishing a cavity.

The surface of the core-shell particles 20 formed by the ultrasonic treatment may include a transition metal oxide coating layer 150 surrounding a noble metal shell 120.

The transition metal oxide coating layer 150 may be formed by an insufficient dissolution of a transition metal to a platinum lattice at the ultrasonic treatment, a difference of the reducing rate, and a component ratio of excessive amount of a transition metal.

The transition metal oxide coating layer 150 may have a thickness of about 0.2 nm to about 0.88 nm. When the thickness of the transition metal oxide coating layer 150 is less than about 0.2 nm, the transition metal oxide coating layer 150 may be formed in a non-uniform and thin thickness, so that the particle size may not be well controlled; while when the thickness is greater than about 0.88 nm, a crystalline transition metal oxide is generated after the annealing process, leaving a residue.

The transition metal oxide coating layer 150 may be derived from the transition metal precursor as in the transition metal core 110, so the transition metal included in the transition metal oxide coating layer 150 may be same as the transition metal included in the transition metal core 110.

The method of preparing an intermetallic catalyst 30 may provide core-shell particles 20 including a transition metal oxide coating layer 150 in one process using ultrasonic treatment, so that the process may be simplified to save the cost.

Then the core-shell particles 20 are annealed to provide intermetallic particles including a transition metal oxide coating layer 150 (S2).

Atoms of the noble metal and the transition metal may be regularly arranged through the annealing, and a ratio of the transition metal core 110 is decreased to prepare intermetallic particles 130. The intermetallic particles may be an alloy of a noble metal and a transition metal, which is an intermetallic alloy in which the noble metal atom and the transition metal atom are regularly arranged.

As the particle growth is suppressed by the transition metal oxide coating layer 150, the sizes of the intermetallic particles 130 may be controlled to be sizes of several nanometers during the annealing process, so the metal atoms in the alloy may be regularly arranged by performing the annealing at a sufficiently high temperature to enhance uniformity of the composition and a catalytic activity.

The annealing may be performed at a temperature of about 700° C. to about 1200° C. for about 0.5 hours to about 16 hours. When the annealing temperature is less than about 700° C. or the annealing time is less than about 0.5 hours, an increase in catalytic activity may be limited due to the lack of improvement in the regular arrangement of metal atoms in the alloy. When the annealing temperature is greater than about 1200° C. or the annealing time is greater than about 16 hours, an effect of inhibiting particle size growth may decrease, resulting in decreased catalytic activity.

The annealing process may be performed in an inert gas atmosphere such as argon, nitrogen, or a mixed gas atmosphere of an inert gas and hydrogen ($H_2$), and an atmosphere including about 1 volume % to about 10 volume % of hydrogen based on a total volume of the mixed gas.

The transition metal oxide coating layer 150 is removed from the intermetallic particles 130 (S3).

The removing of the transition metal oxide coating layer 150 in the intermetallic particles 130 may be performed by acid treatment.

The acid used for the acid treatment may include $HClO_4$, $HNO_3$, HCl, or a combination thereof.

A concentration of the acid may be about 0.01 M to about 1.0 M. When the concentration of the acid is less than about 0.01 M, it is insufficiently etched, and the acid treatment time may be lengthened, while when the concentration of the acid is greater than about 1.0 M, platinum may be dissolved together.

The acid treatment may be performed at a temperature of about 60° C. to about 94° C. for about 2 hours to about 4 hours. When the acid treatment temperature is less than about 60° C. or the acid treatment time is less than 2 hours, etching may be insufficient. When the acid treatment temperature is greater than about 94° C., a boiling phenomenon in the container may be severe even if refluxed, causing safety problems and when the acid treatment time is greater than about 4 hours, there is no change in the transition metal content, which may waste process time and cost.

Further provided is an intermetallic catalyst 30 prepared by the method of preparing an intermetallic catalyst as described herein.

The intermetallic catalyst 30 may include an intermetallic core 210 of a transition metal and a noble metal, and a noble metal skin layer 220 surrounding the intermetallic core 210.

According to the method of preparing an intermetallic catalyst 30 as described herein, since the core-shell particles 20 formed by being irradiated with the ultrasonic waves include a transition metal in the core, the intermetallic catalyst 30 obtained by performing the same with the annealing includes noble metal particles exposed on the outer surface of the catalyst to provide a noble metal skin layer 220 in which the noble metal particles are dispersed with a high density on the surface of the intermetallic catalyst 30.

In general, since a slurry preparation process for electrode formation proceeds at a pH of less than or equal to about 1, and the fuel cell is operated in an acidic atmosphere, the transition metals in the alloy catalyst may be easily eluted, and the eluted transition metals enter the ion exchange membrane to increase the membrane resistance. As a result, deterioration of the fuel cell performance may be caused.

However, the intermetallic catalyst 30 obtained by the method of preparing an intermetallic catalyst further improves a bonding energy between the transition metal-noble metal by providing the transition metal-noble metal alloy with a degree of ordering as well as including a noble metal skin layer 220 on the surface, so that it may suppress eluting of the transition metal to solve the deterioration problems of the fuel cell performance.

A thickness of the noble metal skin layer 220 may be less than or equal to about 0.5 nm, or may be about 0.2 nm to about 0.5 nm. When the thickness of the noble metal skin layer 220 is greater than about 0.5 nm, it has a surface structure similar to that of the existing platinum catalyst, and thus the effect of improving performance due to alloying may be lost.

In the intermetallic catalyst 30, the atomic ratio of the noble metal and the transition metal may be about 1:0.2 to about 1:0.6. When the atomic ratio of the transition metal is less than about 0.2, formation of the intermetallic structure may be insufficient, and when it is greater than about 0.6, the thickness of the noble metal skin layer 220 may be insufficient.

A particle diameter of the intermetallic catalyst 30 may be about 3.5 nm to about 20 nm. When the particle diameter of the intermetallic catalyst 30 is less than about 3.5 nm, ordering of the atomic arrangement may be insufficient, while when it is greater than about 20 nm, it may be insufficient to secure an electrochemical specific surface area.

The intermetallic core may have a degree of ordering of the atomic arrangement of greater than or equal to about 30%. For example, even if an ordered atomic arrangement is formed locally in the particle, it may be collectively referred to as intermetallic. In addition, an upper limit of the degree of ordering of the atomic arrangement of the intermetallic core is not limited since stabilization energy increases as the degree of ordering of the atomic arrangement increases, and may be, for example, less than or equal to about 60%.

Also provided is an electrode for a fuel cell, including the intermetallic catalyst 30 and an ionomer mixed with the intermetallic catalyst 30.

In addition, provided is a membrane-electrode assembly including an anode and a cathode facing each other, and an ion exchange membrane between the anode and cathode, wherein the anode, the cathode, or both are the aforementioned electrodes.

Moreover, provided is a fuel cell including the aforementioned membrane-electrode assembly.

The electrode, the membrane-electrode assembly, and the fuel cell may be the same as those of the general electrode, the membrane-electrode assembly, and the fuel cell, except that the aforementioned intermetallic catalyst 30 is included, so detailed descriptions thereof will be omitted.

EXAMPLE

Hereinafter, specific examples of the invention are described. However, the examples described below are for illustrative purposes only, and the scope of the invention is not limited thereto.

Preparation Example: Preparation of Intermetallic Catalyst

Example 1 to Example 4

Platinum acetylacetonate (or Pt(acac)$_2$), iron acetylacetonate (or Fe(acac)$_3$), and a porous carbon carrier (Vulcan XC72) were added to ethylene glycol to prepare a precursor admixture, and 100 mL of the precursor admixture was irradiated with ultrasonic waves by using tip type ultrasonic waves (Sonic and Materials, model VC-500, amplitude 30%, 13 mm solidprobe, 20 kHz) under an argon atmosphere at output of 150 W for 3 hours to provide core-shell particles including a transition metal oxide coating layer.

At this time, the addition amounts of the noble metal precursor and the transition metal precursor were adjusted so that an atomic ratio of the noble metal and the transition metal may be 1:0.5, 1:1.0, 1:1.5, and 1:2.0, respectively.

The prepared core-shell particles were annealed at a temperature of 800° C. for 2 hours under a H$_2$/Ar mixed gas atmosphere to provide intermetallic particles including a transition metal oxide coating layer.

The intermetallic particles were treated with an acid of 0.1 M HClO$_4$ and an ethanol admixture at a temperature of 94° C. for 4 hours to prepare intermetallic catalysts having each composition of PtFe$_{0.2}$/C, PtFe$_{0.3}$/C, PtFe$_{0.5}$/C, and PtFe$_{0.6}$/C.

Comparative Example 1

A PtFe/C random alloy catalyst was prepared according to the generally-used polyol synthesizing method. Particularly, Pt(acac)$_2$, Fe(acac)$_3$, and a porous carbon carrier (Vulcan XC72) were added to ethylene glycol to prepare a precursor admixture, and the precursor admixture was reduced overnight at a temperature of 200° C. to prepare a random alloy catalyst.

Comparative Example 2

A PtFe/C random alloy catalyst having a 0.2 nm to 0.5 nm-thick Pt skin layer was prepared according to the same method as Example 1 except that the annealing was performed at a temperature of 300° C. for 2 hours instead of at a temperature of 800° C. for 2 hours.

Experimental Example 1: XRD Analysis of Intermetallic Catalyst

Figure 2:
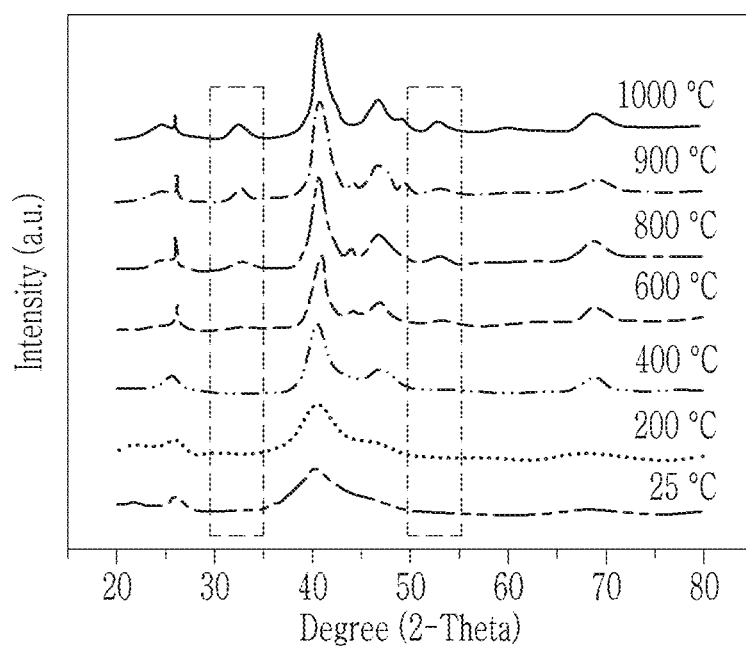
FIG. 2 is a graph showing in-situ XRD analysis results of the intermetallic catalyst prepared in Example 3.

PtFe$_{0.5}$/C of Example 3 was in-situ XRD analyzed, and the results are shown in FIG. 2.

As shown in FIG. 2, XRD peaks (around 33 degree and around 53 degree) corresponding to the intermetals started to be formed from a temperature of 600° C., and then, intensity of the peaks increased as the temperature increased but finally kept constant from a temperature of 800° C.

Figure 3:
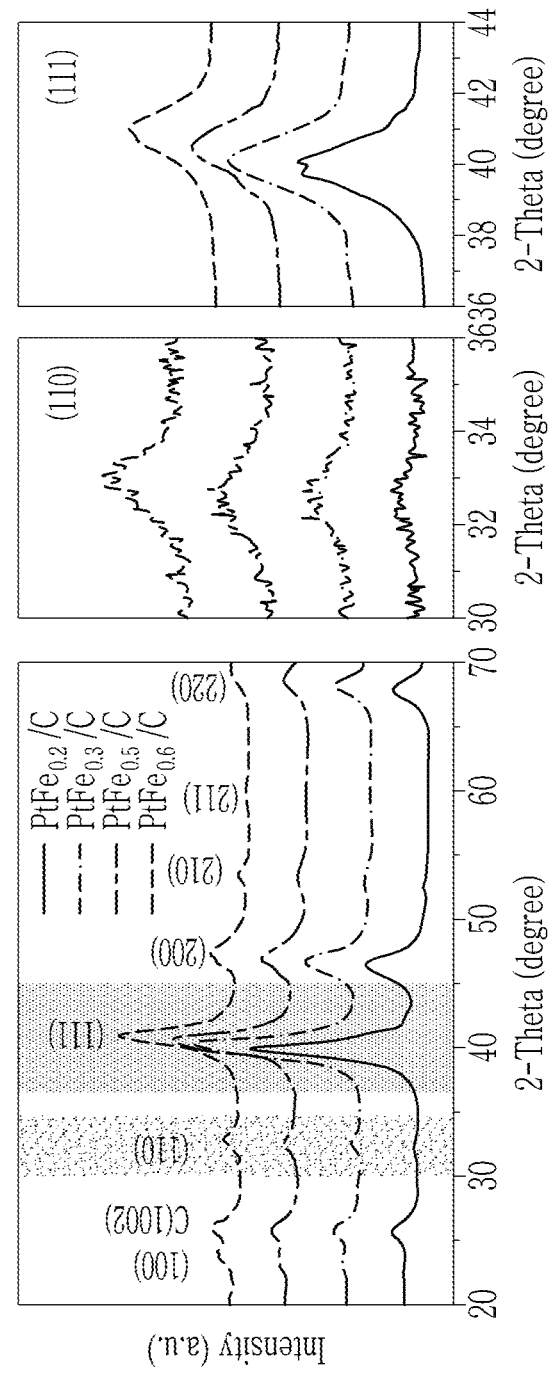
FIG. 3 is a graph showing the results of in-situ XRD analyses of the intermetallic catalysts prepared in Example 1 to Example 4.

In addition, the intermetallic catalysts (PtFe$_{0.2}$/C, PtFe$_{0.3}$/C, PtFe$_{0.5}$/C, and PtFe$_{0.6}$/C) according to Examples 1 to 4 were in-situ XRD analyzed, and the results are shown in FIG. 3.

As shown in FIG. 3, as a Fe content increased in the intermetallic catalysts, (111) peaks shifted to high angles. The reason is that a mixed amount of Fe into a Pt lattice increased. In addition, (110) peaks corresponding to the intermetals increased, as the Fe content increased. The reason is that as the Fe content increased, the ordering of the atomic arrangement increased.

Experimental Example 2: Evaluation of Particle Size According to Composition of Intermetallic Catalyst The compositions of the intermetallic catalysts according to Examples 1 to 4 were examined through an ICP analysis, and the results are shown in Table 1.

TABLE 1

| | Composition | Pt content (wt %) | Fe content (wt %) | Pt:Fe (at %) |
|---|---|---|---|---|
| Example 1 | PtFe$_{0.2}$ | 33.2 | 34.7 | 1:0.2 |
| Example 2 | PtFe$_{0.3}$ | 32.5 | 35.1 | 1:0.3 |
| Example 3 | PtFe$_{0.5}$ | 29.9 | 33.5 | 1:0.5 |
| Example 4 | PtFe$_{0.6}$ | 27.9 | 32.4 | 1:0.6 |

Figure 4:
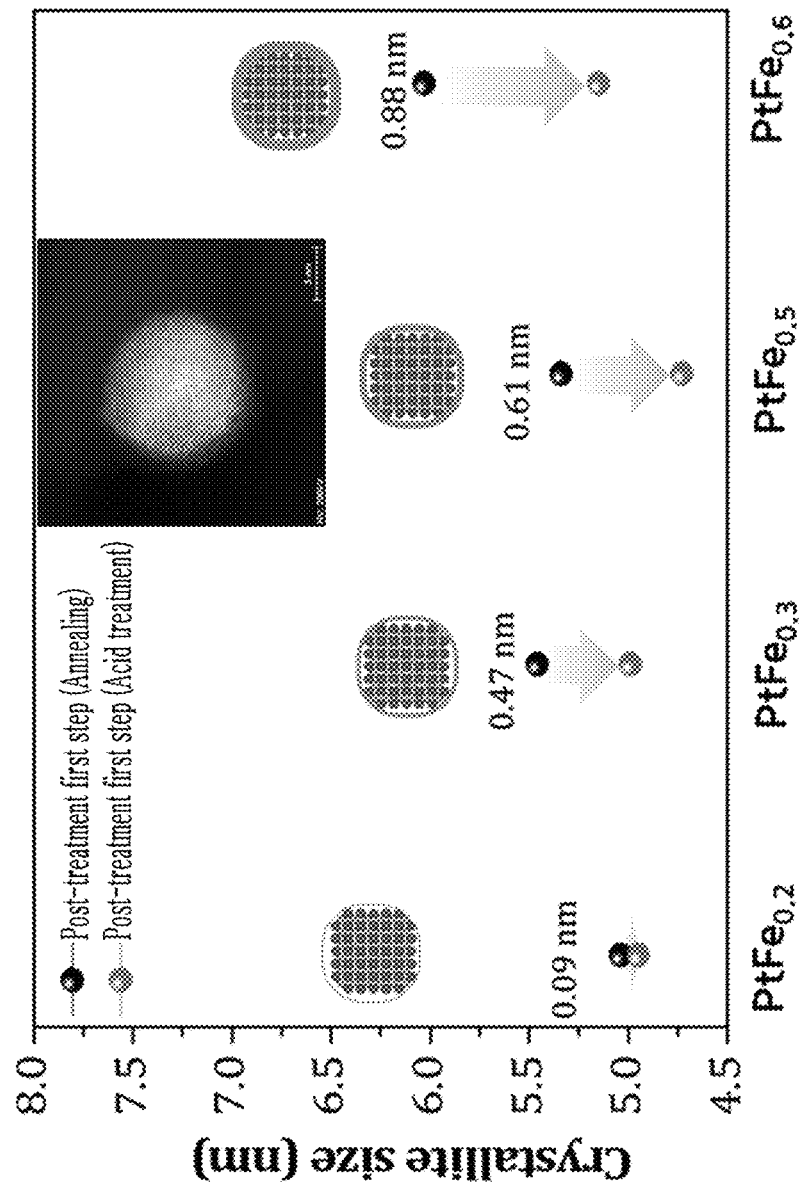
FIG. 4 is a graph showing the results of XRD measurement of particle size changes before and after acid treatment in Example 1 to Example 4.

In addition, particle size changes before and after the acid treatment in Examples 1 to 4 were measured through XRD, and the results are shown in FIG. 4.

As shown in FIG. 4, as an intermetallic particle including a transition metal oxide coating layer through the annealing process included Fe in a higher content, the transition metal oxide coating layer was formed thicker. Particularly, referring to a TEM-HAADF image attached in FIG. 4, the transition metal oxide coating layer (FeO$_x$) was formed to be about 0.5 nm thick or so on the surface of the intermetallic particle.

Figure 5:
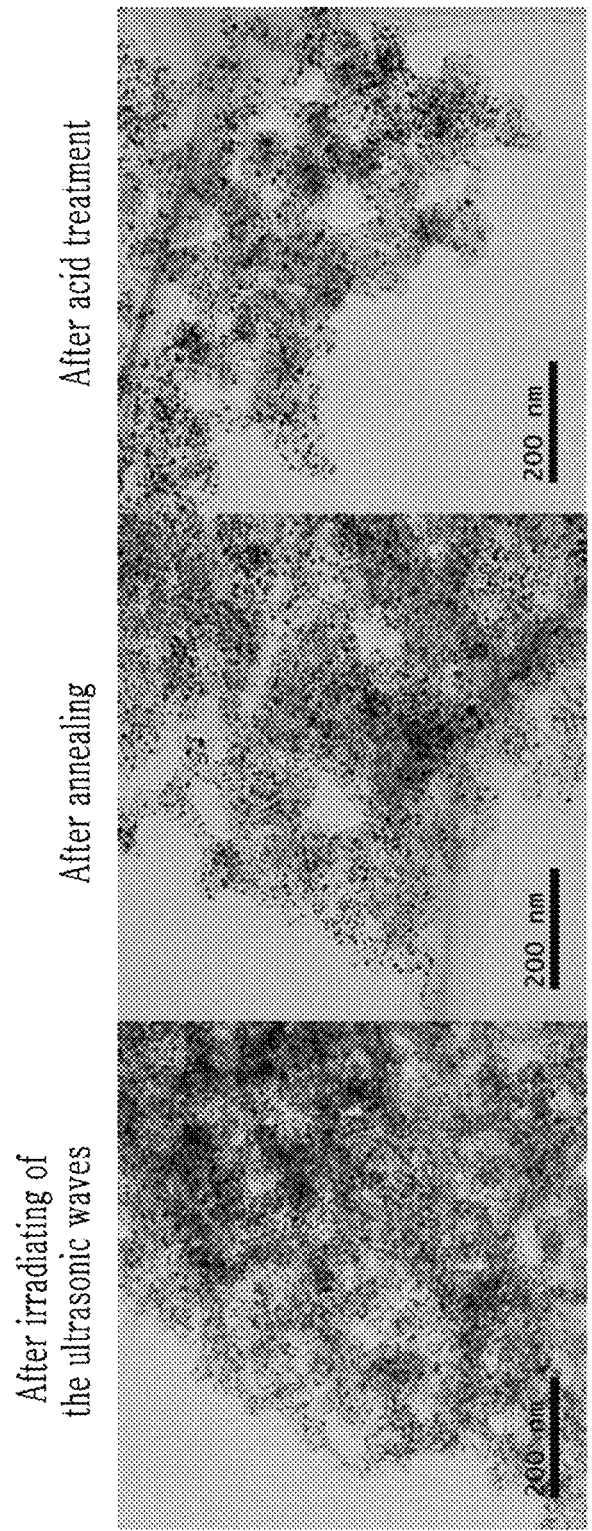
FIG. 5 is transmission electron microscopic (TEM) images of the particles prepared after the ultrasonic irradiation, the annealing, and the acid treatment in Example 1.

FIG. 5 is transmission electron microscopic (TEM) images of the particles prepared after the ultrasonic irradiation, the annealing, and the acid treatment in Example 1.

Figure 6:
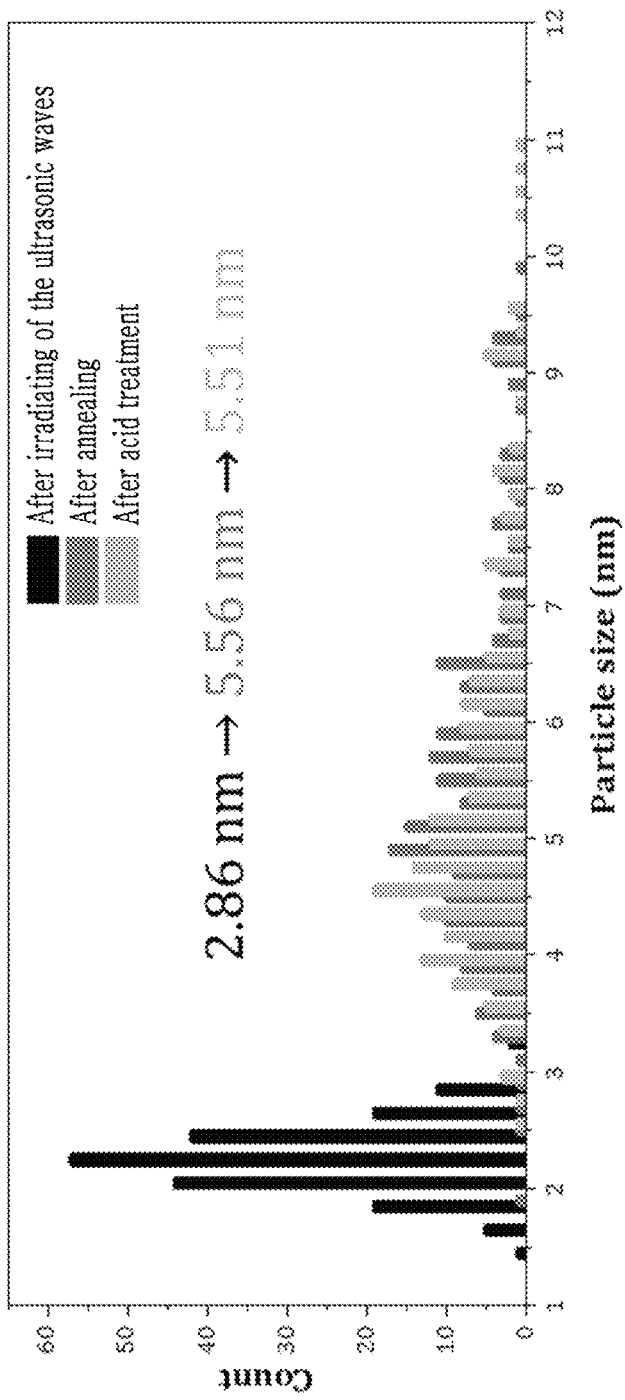
FIG. 6 is a graph showing each particles size after the ultrasonic irradiation, the annealing, and the acid treatment in the transmission electron microscopic image of FIG. 5.

FIG. 6 is a graph showing each particle size after the ultrasonic irradiation, the annealing, and the acid treatment in the transmission electron microscopic image of FIG. 5.

As shown in FIGS. 5 and 6, a transition metal oxide coating layer ($FeO_x$) was formed to be 0.05 nm thick or so on the surface of an intermetallic catalyst ($PtFe_{0.2}$) particle through a particle size change before and after the acid treatment.

Figure 7:
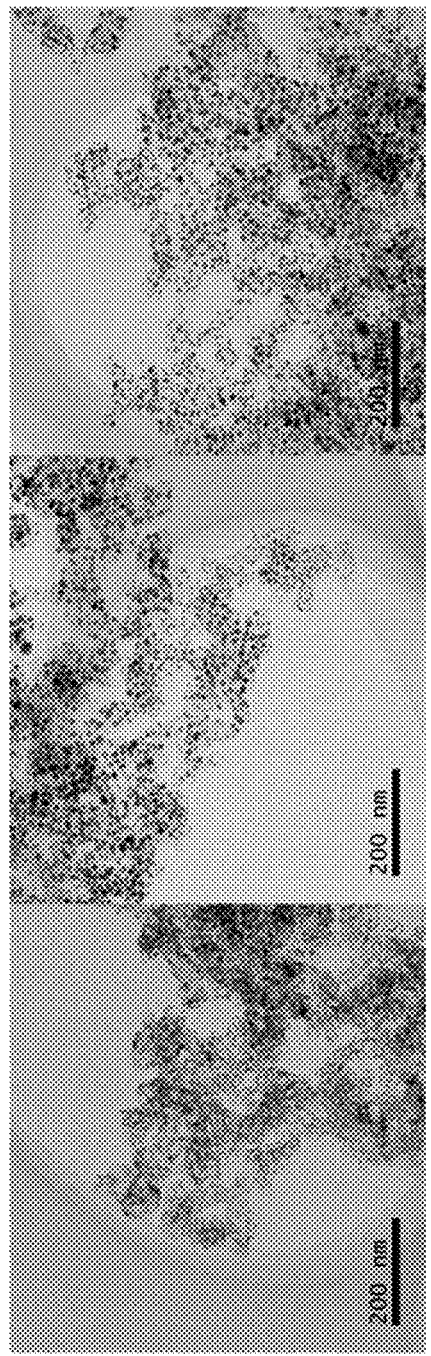
FIG. 7 shows transmission electron microscopic (TEM) images of the particles after the ultrasonic irradiation, the annealing, and the acid treatment in Example 3.
Figure 8:
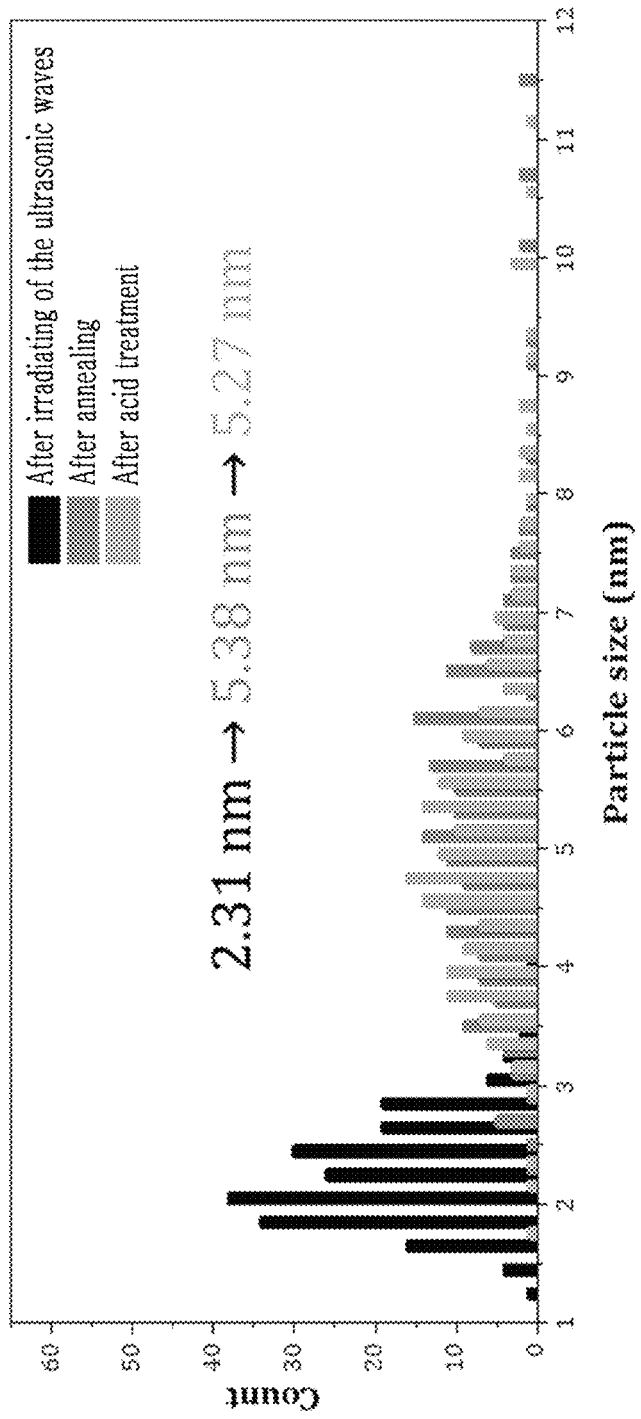
FIG. 8 is a graph showing each particle size after the ultrasonic irradiation, the annealing, and the acid treatment in the transmission electron microscopic image of FIG. 7.

FIG. 7 is transmission electron microscopic (TEM) images of the particles after the ultrasonic irradiation, the annealing, and the acid treatment in Example 3. FIG. 8 is a graph showing each particle size after the ultrasonic irradiation, the annealing, and the acid treatment in the transmission electron microscopic image of FIG. 7.

As shown in FIGS. 7 and 8, a transition metal oxide coating layer ($FeO_x$) was formed to be 0.11 nm thick or so on the surface of an intermetallic catalyst ($PtFe_{0.5}$) particle through a particle size change before and after the acid treatment. In other words, the transition metal oxide coating layer was about twice as thick as that of the intermetallic catalyst according to Example 1.

Experimental Example 3: Structural Analysis of Preparation Steps of Intermetallic Catalyst FIGS. 9 and 10 are a graph and a photograph showing each STEM-EDS analysis result of the intermetallic catalyst of Example 3 after the annealing and the acid treatment.

Figure 9:
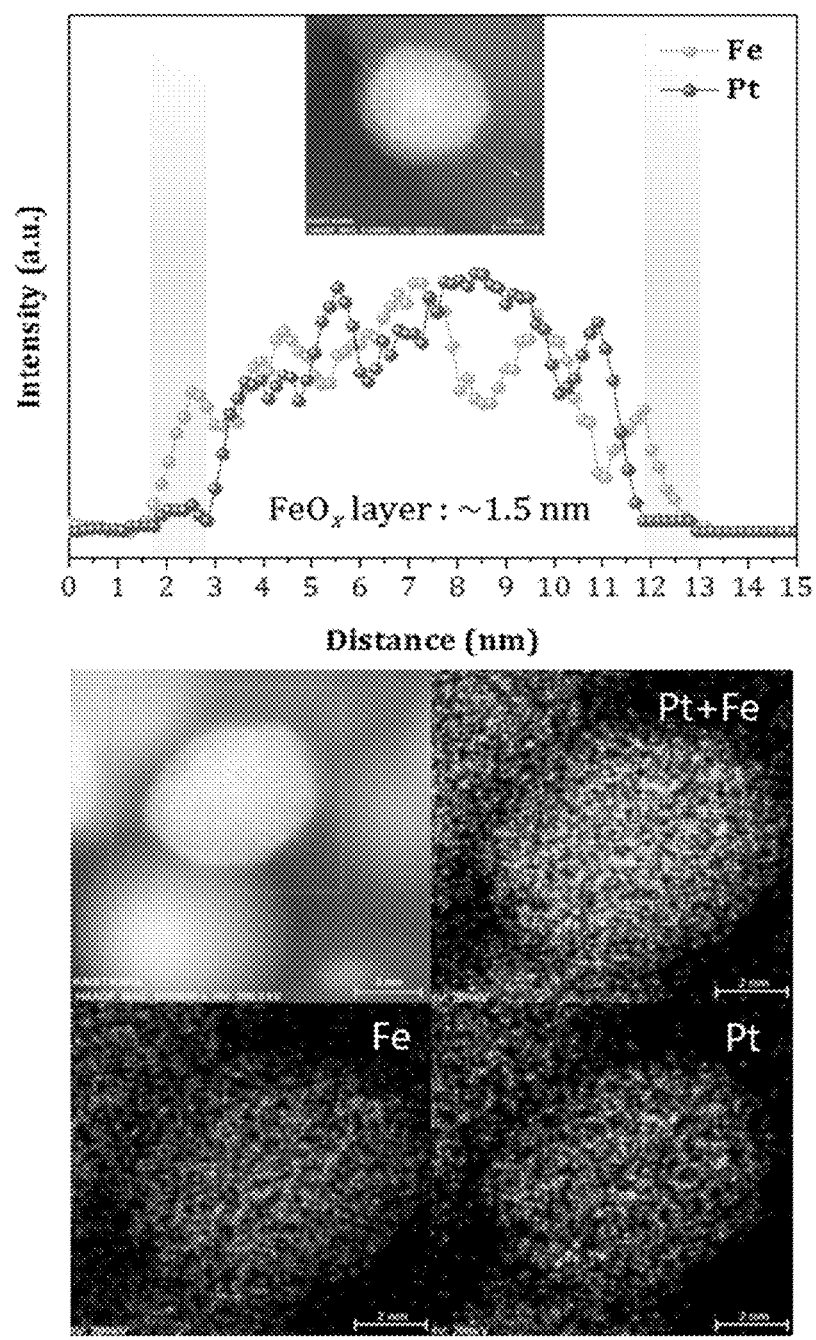
FIGS. 9 and 10 are a graph and a photograph showing each STEM-EDS analysis result of the intermetallic catalyst according to Example 3 after the annealing and the acid treatment.
Figure 10:
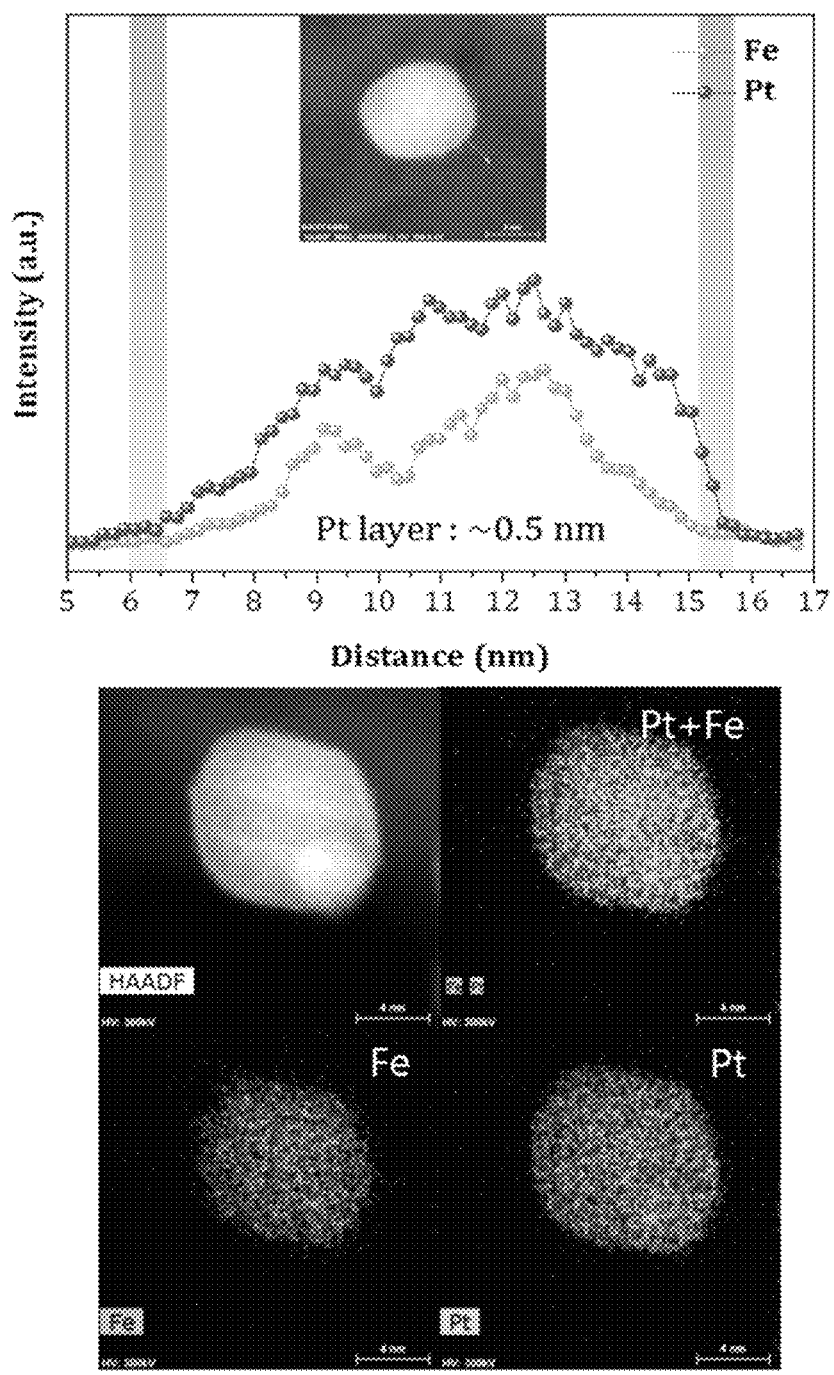

As shown in FIGS. 9 and 10, annealed $PtFe_{0.5}$ catalyst particles included a transition metal oxide coating layer, but the transition metal oxide coating layer was completely removed through the acid treatment.

In addition, after the acid treatment, the intermetallic catalyst had an surface consisting of 1 to 2 Pt atomic layers (a thickness of less than or equal to about 0.5 nm) and internally an intermetallic structure.

Figure 11:
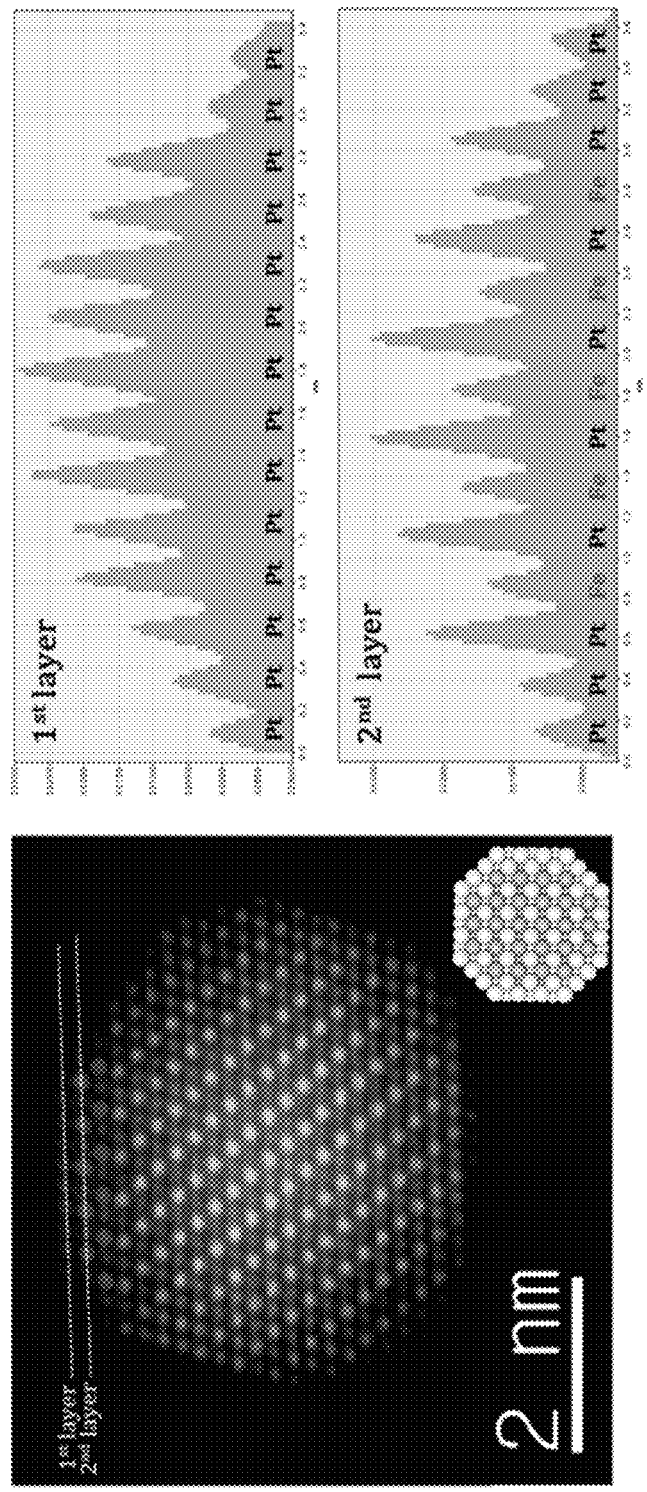
FIG. 11 is a graph and a photograph showing the STEM-HAADF analysis result of the intermetallic catalyst according to Example 3.

FIG. 11 is a graph and a photograph showing the STEM-HAADF analysis result of the intermetallic catalyst according to Example 3.

As shown in FIG. 11, the HAADF result showed that intermetallic $PtFe_{0.5}$ had an about a two-layered Pt atomic shell on the surface and internally an intermetallic structure.

Figure 12:
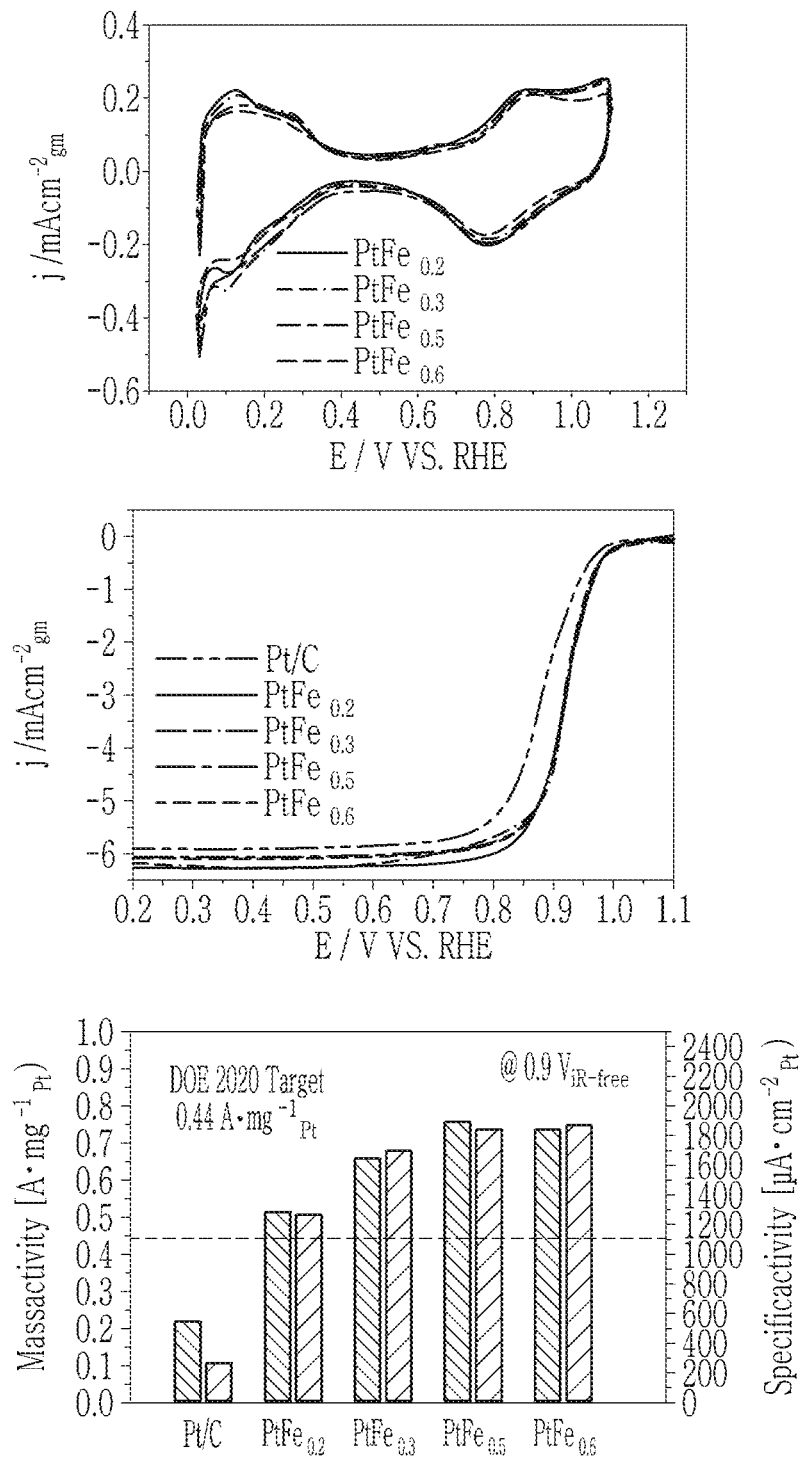
FIG. 12 is a graph showing performances of the intermetallic catalysts according to Examples 1 to 4.

Experimental Example 4: Analysis of Performance and Durability According to Composition of Intermetallic Catalyst Performances of the intermetallic catalysts of Examples 1 to 4 were measured, and the results are shown in FIG. 12. As an comparative example, a commercially-available Pt/C catalyst was used.

As shown in FIG. 12, the synthesized intermetallic catalyst exhibited 2 to 4 times improved catalyst performance based on MA (mass activity) and 5 to 8 times improved catalyst performance based on SA (specific activity) compared with a Pt/C (commercial) catalyst.

Figure 13:
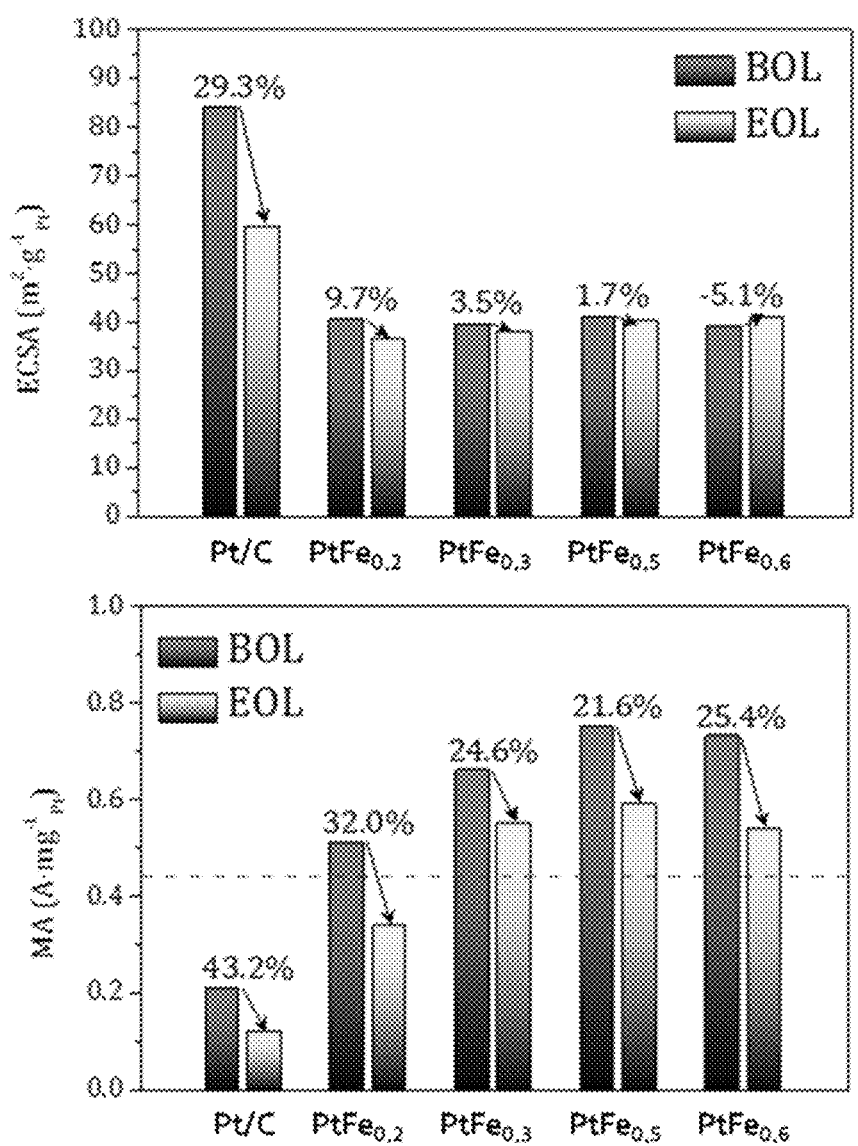
FIGS. 13 and 14 are graphs showing the durability measurement results of the intermetallic catalysts according to Examples 1 to 4.
Figure 14:
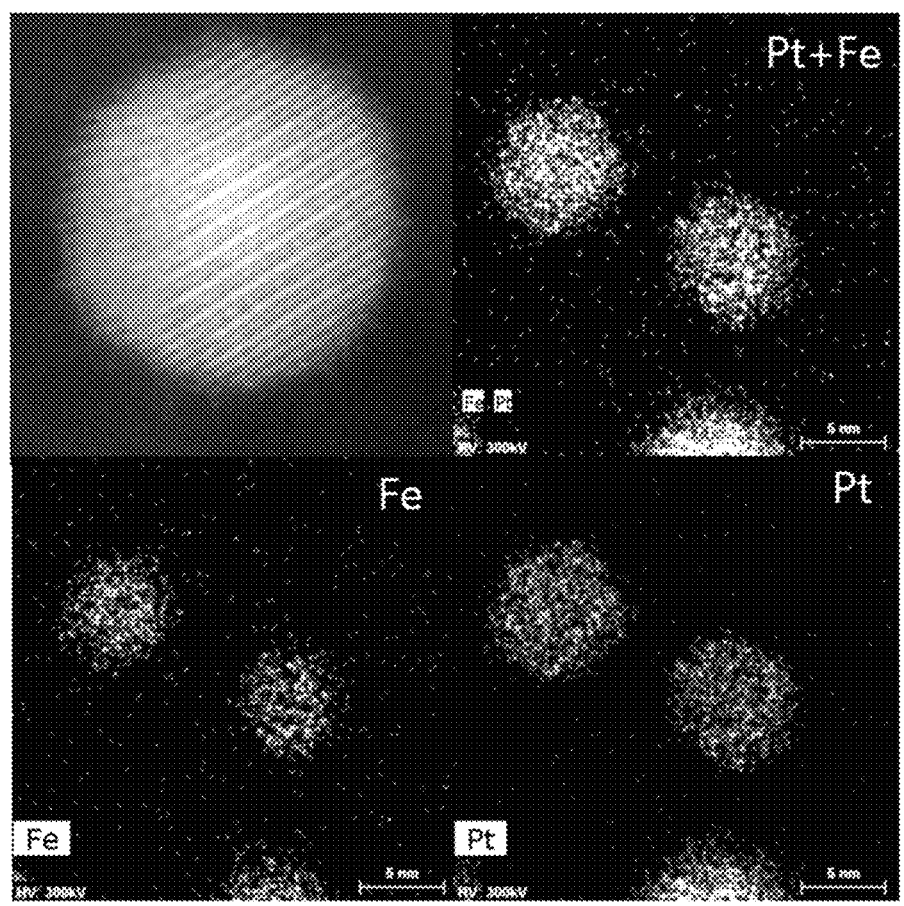

In addition, durability of the intermetallic catalysts according to Examples 1 to 4 was measured, and the results are shown in FIGS. 13 and 14. As Comparative Example 1, a commercially available Pt/C catalyst was used.

As shown in FIGS. 13 and 14, before and after measuring the durability of the intermetallic catalysts according to Examples 1 to 4, ECSA and MA changes were greatly lower than those of the Pt/C catalyst. Accordingly, the intermetallic catalyst secured excellent durability.

In addition, the intermetallic catalysts according to Examples 1 to 4 still maintained an intermetallic crystal structure and a core-shell shape after evaluating the durability.

Experimental Example 5: XRD and EXAFS Analysis of Intermetallic Catalyst

Figure 15:
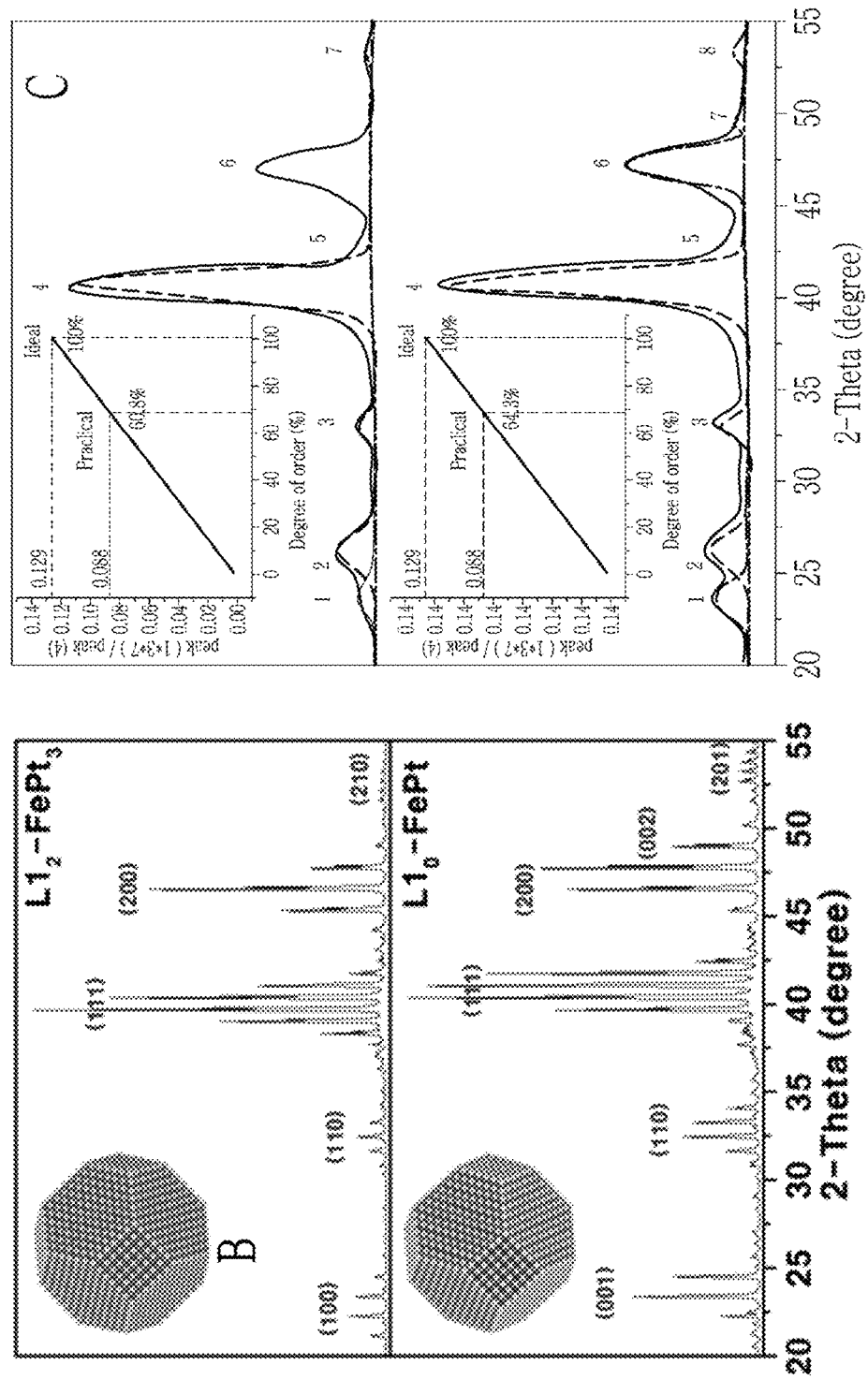
FIGS. 15 and 16 are graphs showing each XRD and EXAFS result in Experimental Example 5.
Figure 16:
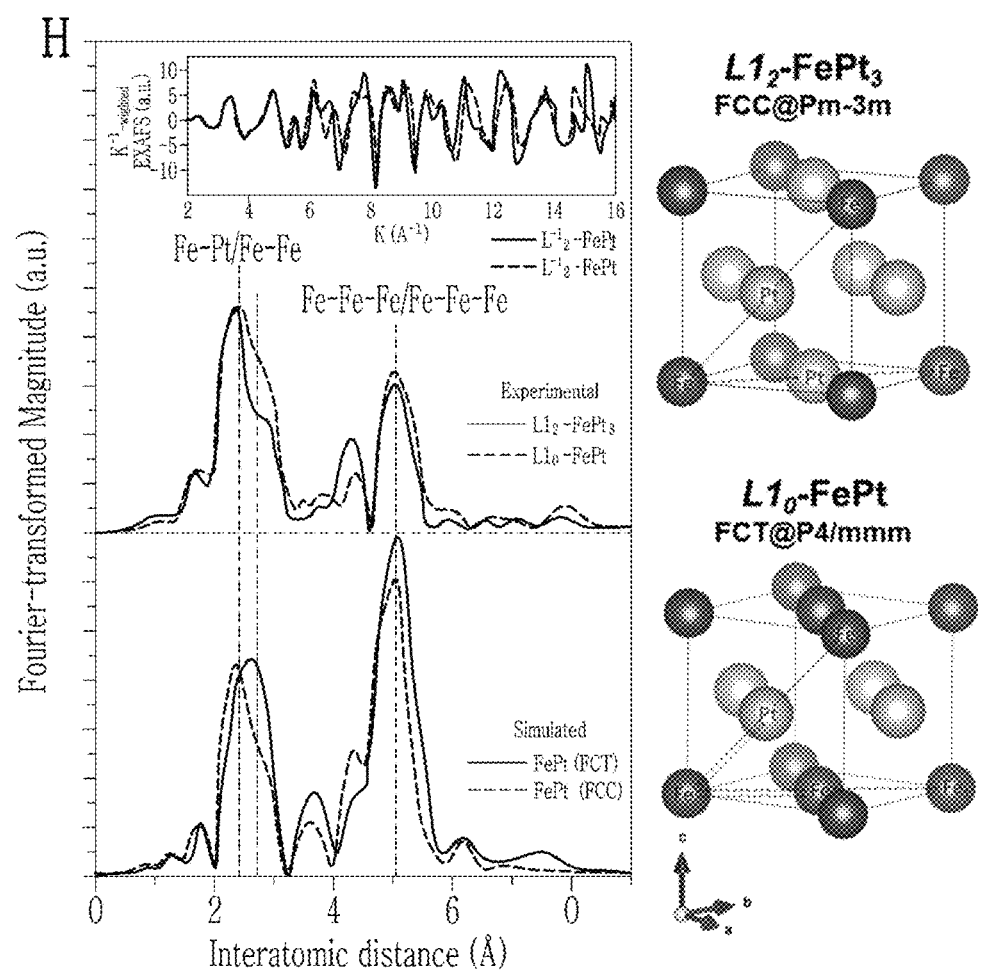

The catalysts according to Examples 1 to 4 were XRD and EXAFS-analyzed, and the results are shown in FIGS. 15 and 16.

FIG. 15 was used to calculate a degree of ordering of the atomic arrangement of the intermetallic PtFe catalyst. In other words, in FIG. 15, P1, P3, P4, P6, P7, and P8 showed intensity of particular peaks in the XRD pattern, and what each peak indicated is shown in Table 2. The degree of ordering of the atomic arrangement of the intermetallic PtFe catalyst was obtained by calculating (P1+P3+P7+P8)/(P4+P6) and converting it into percentage (%) of theoretical value (P1+P3+P7+P8)/(P4+P6) of the intermetallic PtFe catalyst.

TABLE 2

| Peak list | Peak index | Notes |
|---|---|---|
| P1 | 001 | PtFe |
| P2 | 002 | C |
| P3 | 110 | PtFe |
| P4 | 111 | PtFe |
| P5 | 100 | C |
| P6 | 200 | PtFe |
| P7 | 002 | PtFe |
| P8 | 201 | PtFe |

As shown in FIGS. 15 and 16, XRD and EXAFS were the analysis results of the two intermetallic phases $L1_2$ and $L1_0$ that Fe—Pt might have, and herein, $PtFe_{0.2}$ had the $L1_2$ phase, and $PtFe_{0.5-0.6}$ had the $L1_0$ phase.

Experimental Example 6: ECSA and Activity Analysis of Intermetallic Catalyst

ECSA (electrochemical surface area) and activity of the catalysts of Example 1 and Comparative Examples 1 and 2 and a commercially-available Pt/C catalyst were measured, and the results are shown in Table 3.

ECSA indicates a specific surface area of platinum, and as a particle size is smaller, and the surface of the platinum is more exposed, ECSA is increased. Herein, since the intermetallic catalyst of Example 1 had a particle size of less than or equal to 5 nm, and the Pt/C catalyst had a particle size of less than or equal to 3 nm, ECSA might have a deviation.

| Samples | ECSA ($m^2/g_{Pt}$) | Mass activity ($A/mg_{Pt}$) |
|---|---|---|
| Comparative Example 1 | 63.5 | 0.30 |
| Comparative Example 2 | 64.8 | 0.26 |
| Pt/C | 50-80 | less than equal to 0.20 |
| Example 1 | ~40 | 0.8 |

As shown in Table 3, the intermetallic catalyst of Example 1 exhibited excellent mass activity compared with those of Comparative Examples 1 and 2 and the commercially available Pt/C catalyst.

While this invention has been described in connection with what is presently considered to be preferred exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

10: precursor admixture
20: core-shell particle
30: intermetallic catalyst
110: transition metal core
120: noble metal shell
130: intermetallic particle
150: transition metal oxide coating layer
210: intermetallic core
220: noble metal skin layer

What is claimed is:

1. A method of preparing an intermetallic catalyst, comprising:
forming core-shell particles comprising a transition metal oxide coating layer,
treating the core-shell particles to form intermetallic particles including a transition metal oxide coating layer; and
removing the transition metal oxide coating layer from the intermetallic particles.

2. The method of claim 1 wherein the core shell particles are formed by one or more steps comprising treating a precursor admixture comprising a noble metal precursor and a transition metal precursor with ultrasonic waves.

3. The method of claim 2 wherein the precursor admixture further comprises a carrier.

4. The method of claim 1, wherein the core-shell particles comprise:
a transition metal core,
a noble metal shell surrounding the transition metal core, and
a transition metal oxide coating layer surrounding the noble metal shell.

5. The method of claim 4, wherein the transition metal in the transition metal oxide coating layer and the transition metal in the transition metal core are the same transition metal derived from the transition metal precursor.

6. The method of claim 1, wherein a thickness of the transition metal oxide coating layer is about 0.2 nm to about 0.88 nm.

7. The method of claim 2, wherein the noble metal comprises one or more selected from the group consisting of platinum (Pt), ruthenium (Ru), osmium (Os), iridium (Ir), palladium (Pd), and an alloy thereof.

8. The method of claim 2, wherein the transition metal comprises one or more selected from the group consisting of cobalt (Co), iron (Fe), nickel (Ni), zinc (Zn), tin (Sn), manganese (Mn), copper (Cu), scandium (Sc), titanium (Ti), vanadium (V), chromium (Cr), zirconium (Zr), yttrium (Y), niobium (Nb), molybdenum (Mo), ruthenium (Ru), rhodium (Rh), osmium (Os), palladium (Pd), cadmium (Cd), iridium (Ir), gold (Au), silver (Ag), and an alloy thereof.

9. The method of claim 3, wherein the carrier comprises one or more selected from the group consisting of carbon black, graphite, a carbon nanofiber, a graphitized carbon nanofiber, a carbon nanotube, a carbon nanohorn, and a carbon nanowire.

10. The method of claim 2, wherein the treating with the ultrasonic waves is performed for about 20 minutes to about 4 hours at an output of about 125 W to about 200 W based on 100 mL of the precursor admixture.

11. The method of claim 2, wherein each of the intermetallic particles comprises
an intermetallic core comprising a transition metal and a noble metal, and
a transition metal oxide coating layer surrounding the intermetallic core.

12. The method of claim 1, wherein the treating of the core shell particles comprises annealing performed at a temperature of about 700° C. to about 1200° C. for about 0.5 hours to about 16 hours.

13. (Currently Amended The method of claim 12 wherein:
the annealing is performed under a mixed gas including hydrogen ($H_2$) and argon (Ar), and
the mixed gas comprises hydrogen ($H_2$) in an amount of about 1 volume % to about 10 volume % based on a total volume of the mixed gas.

14. The method of claim 1, wherein the removing of the transition metal oxide coating layer from the intermetallic particles is performed by acid treatment.

15. The method of claim 14, wherein the acid treatment is performed at a temperature of about 60° C. to about 94° C. for about 2 hours to about 4 hours and the acid used for the acid treatment comprises $HClO_4$, $HNO_3$, HCl, or a combination thereof, and the acid concentration is about 0.01 M to about 1.0 M.

16. An intermetallic catalyst comprising:
an intermetallic core of a transition metal and a noble metal, and
a noble metal skin layer surrounding the intermetallic core.

17. The intermetallic catalyst of claim 16, wherein in the intermetallic catalyst, an atomic ratio of the noble metal and the transition metal is about 1:0.5 to about 1:2.0.

18. The intermetallic catalyst of claim 16, wherein a particle diameter of the intermetallic catalyst is about 3.5 nm to about 20 nm.

19. The intermetallic catalyst of claim 16, wherein a thickness of the noble metal shell is less than or equal to about 0.5 nm.

20. The intermetallic catalyst of claim 16, wherein the intermetallic core has a degree of ordering of atomic arrangement of greater than or equal to about 30%.

* * * * *